July 8, 1930.  L. F. PHANEUF  1,770,086
AUTOMOBILE TRUCK
Filed May 23, 1928
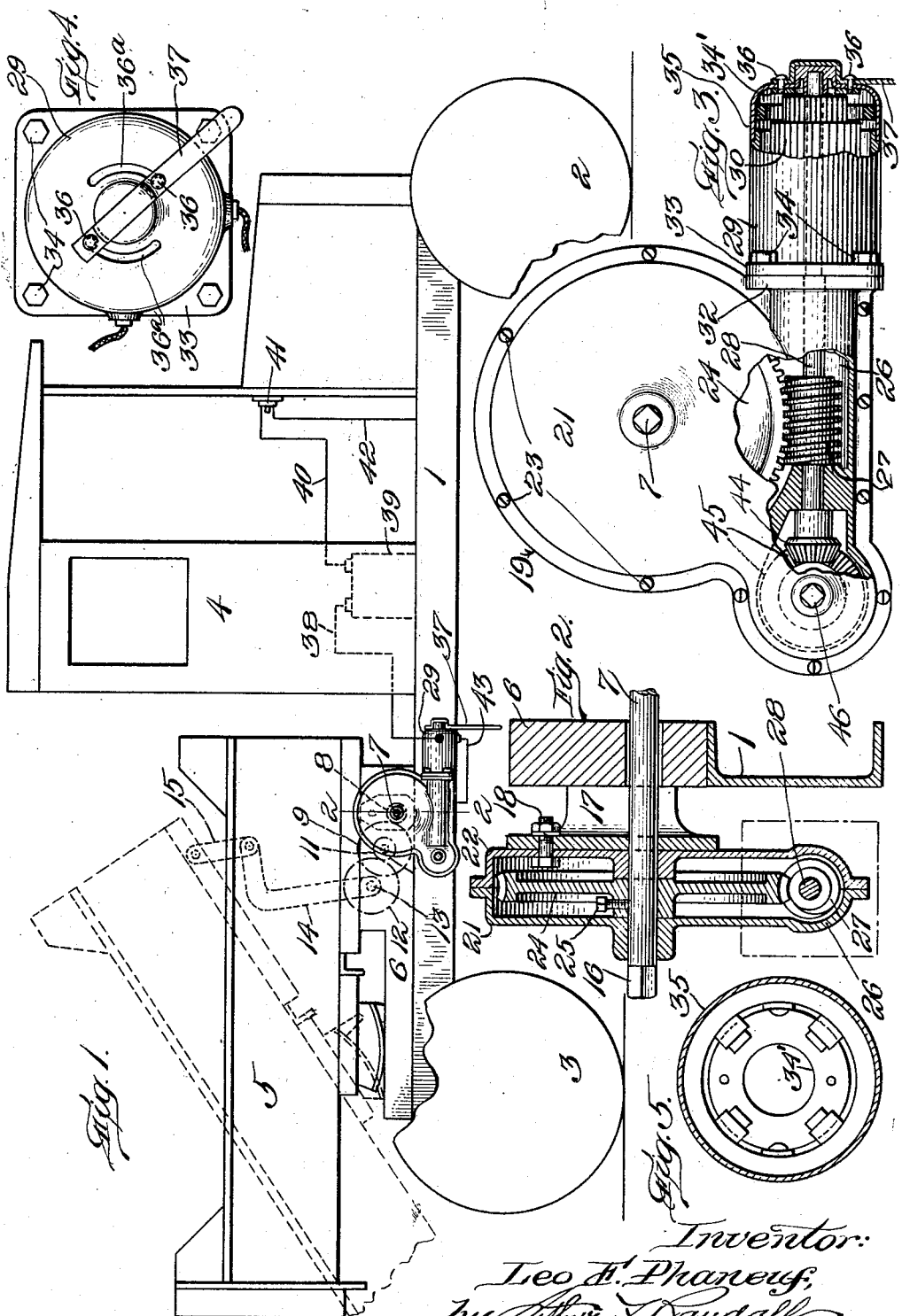
Inventor:
Leo F. Phaneuf,
by Arthur E. Randall, atty.

Patented July 8, 1930

1,770,086

UNITED STATES PATENT OFFICE

LEO F. PHANEUF, OF NEW BEDFORD, MASSACHUSETTS

AUTOMOBILE TRUCK

Application filed May 23, 1928. Serial No. 279,998.

My invention relates to dumping trucks and particularly to automobile dumping trucks, the main object of the invention being to improve the construction of the same.

Automobile trucks have heretofore been constructed with tilting or dumping bodies and with manually actuated means for operating the same, and there are many dumping automobile trucks of this type in use at the present time. A truck of the type referred to includes as part of the body-operating mechanism a main shaft mounted on the chassis of the vehicle and connected with the tilting body by suitable gearing through which rotation of said shaft operates the body, said shaft being manually actuated by means of a crank handle applied to one end thereof at one side of the vehicle. With most trucks of this type it has heretofore been necessary to provide means for locking the body in its tilted position and sometimes, also, to provide means for locking the body in its lowermost or horizontal position. My invention provides a self-contained unitary attachment for the actuating shaft of a standard automobile dumping truck body-operating mechanism of the class just referred to by means of which the same may be power-driven in either direction to positively raise and lower the body, and by which said shaft is normally locked against rotation in either direction.

Another feature of my invention consists in providing a body-actuating shaft journaled on the chassis of the vehicle carrying a worm gear meshing with a worm that is driven by an electric motor, said worm and electric motor being also mounted on the chassis of the vehicle. In the best form of my invention means is provided by adjustment of which the motor may be caused to drive the worm in either direction. In practice I prefer to construct the motor so that its brushes are rotatably adjustable with relation to the armature of the motor to control and determine the direction in which the latter is operated to drive the worm.

Thus in the preferred form of my invention the engagement of the worm with the worm gear on the actuating shaft of the body-operating mechanism serves to normally lock said shaft against rotation in either direction while rotative adjustment of the brushes with respect to the armature of the motor provides for stopping; starting in either direction, and regulating the speed, of said motor.

Other features of my invention are hereinafter pointed out.

In the accompanying drawings:

Figure 1 is a partial side elevation of an automobile dumping truck constructed in accordance with my invention.

Figure 2 is a partial section on line 2—2 of Figure 1.

Figure 3 is an enlarged side elevation of the self-contained attachment unit hereinafter described.

Figure 4 is an end elevation of the motor hereinafter described.

Figure 5 is a cross-sectional view of the brush carrier of the motor.

Having reference to the drawings, 1 is the chassis of my improved automobile dumping truck; 2 and 3 are front and rear wheels of the truck; 4 is the cab, and 5 the body. The body 5 is pivotally connected with a body seat 6 fastened in position upon the top of the chassis 1 as usual so that said body may be swung upwardly into the tilted position indicated by dotted lines. On the seat 6 is mounted body-operating mechanism including a main shaft 7 carrying a pinion 8 operating through the usual gears 9, 11 and 12 to drive a shaft 13 to which is fixed one or more arms 14, each connected by a link 15 with the forward end portion of the body 5.

The main shaft 7 extends outwardly beyond the chassis 1 and seat 6 and has its outer end portion made square as at 16 to receive upon it a crank handle, not shown, by means of which the shaft 7 has heretofore been manually rotated. By means of this crank handle the shaft 7 was manually rotated in one direction to adjust the body 5 into its tilted position, indicated by dotted lines, and in the opposite direction to lower it again into its full line position. So far as described the construction and operation are the same as heretofore. Also, it has been customary, heretofore, to provide a bracket 17 upon the outside of the seat 6 adjacent the shaft 7 on which a pawl, not shown, was pivotally mounted by means of a bolt 18, said pawl engaging a ratchet wheel, not shown, fixed on the shaft 7 to lock the body 5 in its tilted position.

In proceeding in accordance with my invention I dispense with the ratchet wheel, its pawl, and the crank handle above referred to, and provide an electric driving unit attachment including a gear box 19 comprising two approximately counterpart sections 21 and 22 fastened together by means of screws 23. The two parts of this gear box are made with apertures to receive the shaft 7 on to which latter said box is slid from the outer end thereof. The inner section or part 22 of the gear box is made with a bolt hole to receive the latch bolt 18 by means of which said section or part is clamped rigidly to the bracket 17, said bolt co-operating with the shaft 7 to hold the gear box rigidly in position against pivotal or bodily movement relatively to shaft 7, except that the latter is free to rotate relatively to the gear box.

Within the gear box 19 is a worm gear 24 mounted on the shaft 7 and fixed thereto by a set screw 25.

The lower portion of the gear box 19 is made with a chamber 26 to accommodate a worm 27 that is in mesh with the gear 24, this worm 27 being fast on the armature shaft 28 of an electric motor 29 whose armature is shown at 30, Figure 3.

At one end of the worm chamber 26 the gear box 29 is made with external flanges providing a seat 32 for the frame of motor 29 which is also made with an external apertured flange 33 that is fastened by screws 34 to the seat 32 of the gear box, said seat being provided with threaded apertures to receive the screws 34.

The brushes of motor 29 which co-operates with the commutator thereof are mounted upon a brush carrier-plate 34' rotatably mounted within the commutator housing 35, said plate being connected by screws 36, extending through slots 36ª provided in housing 35, with a hand lever 37. One circuit terminal or binding post of motor 29 is connected by a wire 38 with one pole of the usual storage battery 39 of the vehicle, while the other pole of said battery is connected by a wire 40 with one circuit terminal of a normally open switch 41 mounted on the dash of the vehicle. The other circuit terminals of the switch 41 and of motor 29 are grounded, respectively, by wires 42 and 43 on the metal chassis 1.

It will thus be clear that when switch 41 is in closed condition the circuit of motor 29 is complete and that if hand lever 37 is positioned at the limit of its movement in one direction the armature 30 will be driven in one direction and if at the limit of its movement in the opposite direction said armature will be driven in the opposite direction. Thus by means of hand lever 37 the motor 29 may be adjusted to drive the worm 27 in either direction.

It will, of course, be clear that rotation of the worm 27 in one direction operates through gear 24 and the usual body operating mechanism above described, to tilt the body 5, while rotation of the worm in the opposite direction returns body 5 to its normal horizontal position.

In the form of my invention herein shown the armature shaft 28 extends beyond the worm 27 through a bearing provided on the gear box 21—22 and has fixed on it a beveled pinion 44 in mesh with a beveled gear 45 fast on a short shaft 46 journaled in bearings provided on the two sections of the gear box. This shaft 46 is disposed at right angles to the shaft 28 and at one end thereof it extends outwardly beyond the adjacent gear box section 21 and is made square to adapt it to receive upon it the socket hub of a crank, not shown, which, however, is normally not in position on said shaft 46.

When the worm 27 is motor driven to operate the gear 24 shaft 46 is idly rotated through pinion 44 and gear 45. In the event, however, that battery 39 becomes exhausted, or the motor 29 is, through any cause, rendered inoperative, the driver of the vehicle applies the crank handle, referred to above, to the shaft 46 and manually operates the worm 27.

It will thus be clear that the gear box mechanism may be driven either by the motor 29 or by the shaft 46.

The motor 29 is preferably an automobile starter motor of well known make which I modify or alter to the extent of providing for rotative adjustment of its brushes as described, while the battery 39 may be the usual six or eight volt storage battery of the vehicle which is also used for starting and lighting.

From the above description it will be apparent that I have provided a simple, inexpensive and direct electro-mechanical drive, or operating mechanism, for the main shaft or element of the body-operating mechanism which latter may be of the originally manually actuated type herein shown and described, or of any other suitable type; and further, that the worm and worm gear of this drive serve to lock the body 5 in its every position of rest as well as serving as power transmitting members. Furthermore, the gear box above described, together with the adjacent end of the frame of motor 29, completely incloses the worm and gear and provides a convenient receptacle or holder for lubricating grease as well as a motor support. It is a feature of advantage also, that the gear box with the parts carried by it make up a complete self-contained power drive unit which may be installed or incorporated in an existing standard type of dumping automobile truck without any alteration whatever either in the truck itself or in the body-operating mechanism other than the removal of a very few parts of the latter.

What I claim is:—

1. A power unit attachment for incorporation in an existing automobile truck having a chassis, a dumping body mounted on said chassis, and body-operating mechanism including an originally manually actuated main shaft, said unit comprising a gear box having provision for being fixed immovably on the truck in a position adjacent one end of said shaft with the latter extending into the same; an electric motor mounted upon and wholly supported by said gear box with its armature shaft extending into the latter; gearing for connecting the armature shaft of the motor with said main shaft including a driving member within said box fast on said armature shaft and a driven member within said box and adapted to be fastened on said main shaft; a circuit for said motor, and means for operating said circuit to start, stop and reverse said motor.

2. A power unit attachment for incorporation in an existing automobile truck having a chassis, a dumping body mounted on said chassis, and body-operating mechanism including an originally manually actuated main shaft, said unit comprising a gear box having one side wall formed with an aperture of approximately the same diameter as that of said shaft through which the latter extends to the interior of said gear box and having provision for being fixed immovably to the truck; an electric motor mounted upon and wholly supported by said gear box with its armature shaft extending into the latter; gearing for connecting the armature shaft of the motor with said main shaft consisting of a driving member within said gear box fast on the armature shaft of said motor and a driven gear within said gear box meshing with said driving member and adapted to be fastened on said main shaft; a circuit for said motor, and means for operating said circuit to start, stop and reverse said motor.

3. An attachment for incorporation in an existing automobile truck, having a chassis, a dumping body mounted on said chassis and body-operating means including a main shaft that is actuated to operate the body, said attachment comprising a closed gear box constructed with provision for fastening the same on the truck adjacent one end of said main shaft with the latter extending into the same; an electric motor mounted upon and wholly supported by said gear box with its armature shaft extending into the latter; a driven gear within said gear box and fast on said main shaft; a gear-driving worm fast on the armature shaft of said motor; a circuit for said motor; means for operating and controlling said circuit to start, stop and reverse said motor; a manually operable shaft journaled in bearings on said gear box and extending into the latter from the exterior thereof, and gearing within said gear box connecting said manually operatable shaft with the armature shaft of said motor, said manually operatable shaft and gearing being normally idly operated by the motor when the latter is operated but affording means through which the armature shaft and worm are manually actuated upon failure of said motor.

4. A power unit attachment of the character described constructed in accordance with claim 2 and wherein said gear box also serves as a lubricant holder.

Signed by me at New Bedford, county of Bristol, State of Massachusetts, this 5th day of May, 1928.

LEO F. PHANEUF.